United States Patent
Zhao et al.

(10) Patent No.: US 11,729,261 B2
(45) Date of Patent: *Aug. 15, 2023

(54) SYSTEMS AND METHODS FOR UNMANNED AERIAL SYSTEM COMMUNICATION

(71) Applicant: TENCENT AMERICA LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/950,755

(22) Filed: Sep. 22, 2022

(65) Prior Publication Data

US 2023/0020091 A1 Jan. 19, 2023

Related U.S. Application Data

(63) Continuation of application No. 17/484,351, filed on Sep. 24, 2021, now Pat. No. 11,522,950, which is a
(Continued)

(51) Int. Cl.
*G06F 15/173* (2006.01)
*H04L 67/1012* (2022.01)
*H04L 67/1029* (2022.01)

(52) U.S. Cl.
CPC ...... *H04L 67/1012* (2013.01); *H04L 67/1029* (2013.01)

(58) Field of Classification Search
CPC .................. H04L 67/1012; H04L 67/1029
(Continued)

(56) References Cited

U.S. PATENT DOCUMENTS 9,537,561 B1   1/2017 Kotecha et al.
9,603,158 B1   3/2017 Ross et al.
(Continued)

FOREIGN PATENT DOCUMENTS

WO   2018042927 A1   3/2018
WO   2019243879 A1   12/2019
WO   2020/163760 A2   8/2020

OTHER PUBLICATIONS

3GPP TR 23.755 V0.9.0, "3rd Generation Partnership Project; Technical Specification Group Services and System Aspects; Study on application layer support for Unmanned Aerial Systems (UAS); (Release 17)", Aug. 2020, pp. 1-29.
(Continued)

*Primary Examiner* — Alicia Baturay
(74) *Attorney, Agent, or Firm* — Sughrue Mion, PLLC

(57) ABSTRACT

Systems and method may provide unmanned aerial system communication. A method, performed by at least one processor that implements at least one server includes: obtaining a group identifier of a pair of an unmanned aerial vehicle (UAV) and a controller of the UAV, or a respective group identifier for each of the pair; provisioning Quality of Service (QoS) for communication of the pair, using the group identifier of the pair or the respective group identifier for each of the pair; and determining whether a condition of the communication satisfies a pre-defined QoS requirement for the communication of the pair of the UAV and the controller, wherein the pre-defined QoS requirement includes a UAV originated QoS and a UAV terminated QoS.

20 Claims, 9 Drawing Sheets

Related U.S. Application Data continuation of application No. 17/096,027, filed on Nov. 12, 2020, now Pat. No. 11,172,019.

(60) Provisional application No. 63/071,434, filed on Aug. 28, 2020.

(58) Field of Classification Search
USPC .......................................................... 709/223
See application file for complete search history.

(56) References Cited

U.S. PATENT DOCUMENTS

| | | | |
|---|---|---|---|
| 9,740,205 B2 | 8/2017 | Ross et al. | |
| 9,881,022 B2 | 1/2018 | Ubhi et al. | |
| 9,902,311 B2 | 2/2018 | Sweeney et al. | |
| 9,918,235 B2* | 3/2018 | Brennan | H01Q 1/28 |
| 9,969,326 B2 | 5/2018 | Ross et al. | |
| 10,036,642 B2 | 7/2018 | Ross et al. | |
| 10,039,114 B2 | 7/2018 | Tan | |
| 10,050,760 B2 | 8/2018 | Ross et al. | |
| 10,051,475 B2 | 8/2018 | Shattil et al. | |
| 10,156,631 B2 | 12/2018 | Parker et al. | |
| 10,168,695 B2 | 1/2019 | Barnickel et al. | |
| 10,202,126 B2 | 2/2019 | Kroop et al. | |
| 10,243,604 B2 | 3/2019 | Ross et al. | |
| 10,281,570 B2 | 5/2019 | Parker et al. | |
| 10,281,576 B2 | 5/2019 | DePasqua | |
| 10,293,818 B2 | 5/2019 | Kroop et al. | |
| 10,327,151 B2 | 6/2019 | Priest et al. | |
| 10,455,520 B2 | 10/2019 | Kosseifi et al. | |
| 10,493,622 B2 | 12/2019 | Sweeney et al. | |
| 10,517,124 B2 | 12/2019 | Balappanavar et al. | |
| 10,524,302 B2* | 12/2019 | Zhao | H04W 36/0011 |
| 10,531,240 B1 | 1/2020 | Sciancalepore et al. | |
| 10,710,710 B2* | 7/2020 | Price | B64C 39/024 |
| 10,771,993 B2 | 9/2020 | Althoff | |
| 10,805,820 B2 | 10/2020 | Bergstrm et al. | |
| 10,856,168 B2 | 12/2020 | Kim et al. | |
| 10,907,940 B1 | 2/2021 | Parker et al. | |
| 10,998,960 B2 | 5/2021 | Wigard et al. | |
| 11,006,330 B2 | 5/2021 | Huang et al. | |
| 11,032,022 B1 | 6/2021 | Sen et al. | |
| 11,074,824 B2 | 7/2021 | Nayak | |
| 11,137,755 B2* | 10/2021 | Phuyal | H04W 36/0085 |
| 11,161,609 B2* | 11/2021 | Cao | B64C 39/024 |
| 11,172,019 B1 | 11/2021 | Zhao et al. | |
| 11,342,980 B2* | 5/2022 | Chin | H04W 80/02 |
| 11,368,409 B2* | 6/2022 | Yilma | H04W 24/08 |
| 11,442,135 B2* | 9/2022 | Akkarakaran | G01S 5/0221 |
| 11,449,054 B2* | 9/2022 | Jeong | B64D 27/24 |
| 11,459,101 B2* | 10/2022 | Moon | B64C 39/024 |
| 11,474,539 B2* | 10/2022 | Mahkonen | G08G 5/0039 |
| 11,485,516 B2* | 11/2022 | Yi | G05D 1/101 |
| 11,492,110 B2* | 11/2022 | Yi | B64F 1/007 |
| 11,503,530 B2* | 11/2022 | Arngren | H04L 45/122 |
| 11,522,950 B2* | 12/2022 | Zhao | H04L 67/125 |
| 2016/0300493 A1 | 10/2016 | Ubhi et al. | |
| 2017/0150373 A1 | 5/2017 | Brennan et al. | |
| 2017/0248969 A1 | 8/2017 | Ham et al. | |
| 2017/0303333 A1 | 10/2017 | Zhao et al. | |
| 2018/0049274 A1* | 2/2018 | Kim | H04W 84/18 |
| 2018/0120829 A1 | 5/2018 | Price | |
| 2018/0204469 A1 | 7/2018 | Moster et al. | |
| 2019/0036630 A1 | 1/2019 | Svennebring et al. | |
| 2019/0077508 A1 | 3/2019 | Shimezawa et al. | |
| 2019/0317530 A1 | 10/2019 | Yang et al. | |
| 2019/0319686 A1 | 10/2019 | Chen, IV et al. | |
| 2020/0105151 A1 | 4/2020 | Mahkonen et al. | |
| 2020/0162990 A1 | 5/2020 | Reimann et al. | |
| 2020/0205211 A1 | 6/2020 | Hong | |
| 2020/0252847 A1 | 8/2020 | Park et al. | |
| 2020/0374778 A1 | 11/2020 | Arngren et al. | |
| 2021/0103294 A1 | 4/2021 | Mahkonen et al. | |
| 2021/0304626 A1 | 9/2021 | Ubhi et al. | |

OTHER PUBLICATIONS

3GPP TS 23.434 V16.4.0, "3rd Generation Partnership Project; Technical Specification Group Services and System Aspects; Service Enabler Architecture Layer for Verticals (SEAL); Functional architecture and information flows (Release 16)", Jul. 2020, pp. 1-120.

International Search Report dated Jan. 31, 2022, issued by the International Searching Authority in application No. PCT/US2021/041032.

Written Opinion dated Jan. 31, 2022, issued by the International Searching Authority in application No. PCT/US2021/041032.

Extended European Search Report dated Sep. 15, 2022 in European Application No. 21863035.8.

"3$^{rd}$ Generation Partnership Project; Technical Specification Group Services and System Aspects; Enhancement for Unmanned Aerial Vehicles; Stage 1 (Release 17)", 3GPP TR 22.829, V17.1.0, Sep. 2019, 47 pages.

* cited by examiner

SYSTEMS AND METHODS FOR UNMANNED AERIAL SYSTEM COMMUNICATION

CROSS-REFERENCE TO THE RELATED APPLICATIONS

This application is a Continuation Application of U.S. application Ser. No. 17/484,351, filed Sep. 24, 2021, which is a Continuation Application of U.S. application Ser. No. 17/096,027, filed Nov. 12, 2020, now U.S. Pat. No. 11,172,019, patented on Nov. 9, 2021, which claims priority from U.S. Provisional Application No. 63/071,434, filed on Aug. 28, 2020, the disclosures of which are incorporated herein by reference in their entirety.

FIELD

Embodiments of the present disclosure relate to operation of unmanned aerial systems, and more specifically, monitoring and allocation of Quality of Service for communication of unmanned aerial systems.

BACKGROUND

Both an unmanned aerial vehicle (UAV) originated quality of service (QoS) (e.g. uplink from an unmanned aerial system (UAS) to a network) or a UAS terminated QoS (e.g. downlink from the network to the UAS) may be maintained for UAS application layer operations. The QoS may include, but is not limited to, network bandwidth, latency, jitter, data loss rate, etc.

SUMMARY

Currently, three supported command and control (C2) communication modes may require different network resources support from a UAS application layer.

Embodiments of the present disclosure may solve the above problem and other problems.

According to one or more embodiments, a method performed by at least one processor that implements at least one server is provided. The method includes: obtaining a group identifier of a pair of an unmanned aerial vehicle (UAV) and a controller of the UAV, or a respective group identifier for each of the pair; provisioning Quality of Service (QoS) for communication of the pair, using the group identifier of the pair or the respective group identifier for each of the pair; and determining whether a condition of the communication satisfies a pre-defined QoS requirement for the communication of the pair of the UAV and the controller, wherein the pre-defined QoS requirement includes a UAV originated QoS and a UAV terminated QoS.

According to an embodiment, the communication of the pair is direct command and control (C2) communication between the UAV and the controller.

According to an embodiment, the condition of the communication includes at least one from among bandwidth, latency, jitter, and data loss rate.

According to an embodiment, the method further includes recognizing the UAV and the controller of the UAV as the pair, based on the UAV and the controller being communicatively connected to the at least one server.

According to an embodiment, the recognizing the pair includes: obtaining a first identifier of the UAV and a second identifier of the controller; and recognizing the UAV and the controller as the pair based on the first identifier and the second identifier being the same.

According to an embodiment, the obtaining includes obtaining the group identifier of the pair, based on requesting creation of one or more groups for the pair, and the provisioning includes provisioning the QoS for the communication of the pair, using the group identifier of the pair.

According to an embodiment, the obtaining includes obtaining the respective group identifier for each of the pair, based on requesting creation of one or more groups for the pair, and the provisioning includes provisioning the QoS for the communication of the pair, using the respective group identifier for each of the pair.

According to an embodiment, the at least one server includes a UAV Application Enablement (UAE) server.

According to an embodiment, the method further includes triggering, based on determining that the condition of the communication does not satisfy the pre-defined QoS requirement, performance of adaptation of the QoS for the pair.

According to an embodiment, the method further includes obtaining an indication that the QoS was successfully adapted.

According to one or more embodiments, a system is provided. The system includes: at least one processor; and memory storing computer code, the computer code including: provisioning code configured to cause at least one server, implemented by the at least one processor, to provision Quality of Service (QoS) for communication of a pair of an unmanned aerial vehicle (UAV) and a controller of the UAV, using a group identifier of the pair or a respective group identifier for each of the pair; and determining code configured to cause the at least one server determine whether a condition of the communication satisfies a pre-defined QoS requirement for the communication of the pair of the UAV and the controller, wherein the pre-defined QoS requirement includes a UAV originated QoS and a UAV terminated QoS.

According to an embodiment, the communication of the pair is direct command and control (C2) communication between the UAV and the controller.

According to an embodiment, the condition of the communication includes at least one from among bandwidth, latency, jitter, and data loss rate.

According to an embodiment, computer code further includes recognizing code configured to cause the at least one server to recognize the UAV and the controller of the UAV as the pair, based on the UAV and the controller being communicatively connected to the at least one server.

According to an embodiment, the recognizing code is configured to cause the at least one server to recognize the UAV and the controller of the UAV as the pair, based on the at least one server obtaining a first identifier of the UAV and a second identifier of the controller that are the same.

According to an embodiment, the computer code further includes requesting code configured to cause the at least one server to request the group identifier of the pair, and the provisioning code is configured to cause the at least one server to provision the QoS for the communication of the pair, using the group identifier of the pair.

According to an embodiment, the computer code further includes requesting code configured to cause the at least one server to request the respective group identifier for each of the pair, and the provisioning code is configured to cause the at least one server to provision the QoS for the communication of the pair, using the respective group identifier for each of the pair.

According to an embodiment, the at least one server includes a UAV Application Enablement (UAE) server.

According to an embodiment, the computer code further includes triggering code configured to cause the at least one server to trigger, based on determining that the condition of the communication does not satisfy the pre-defined QoS requirement, performance of adaptation of the QoS for the pair.

According to one or more embodiments, a non-transitory computer-readable medium storing computer code is provided. The computer code is configured to, when executed by at least one processor that implements at least one server, cause the at least one processor to: provision Quality of Service (QoS) for communication of each of a pair of an unmanned aerial vehicle (UAV) and a controller of the UAV, using a group identifier of the pair or a respective group identifier for each of the pair; and determine whether a condition of the communication satisfies a pre-defined QoS requirement for the communication of the pair of the UAV and the controller, wherein the pre-defined QoS requirement includes a UAV originated QoS and a UAV terminated QoS.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
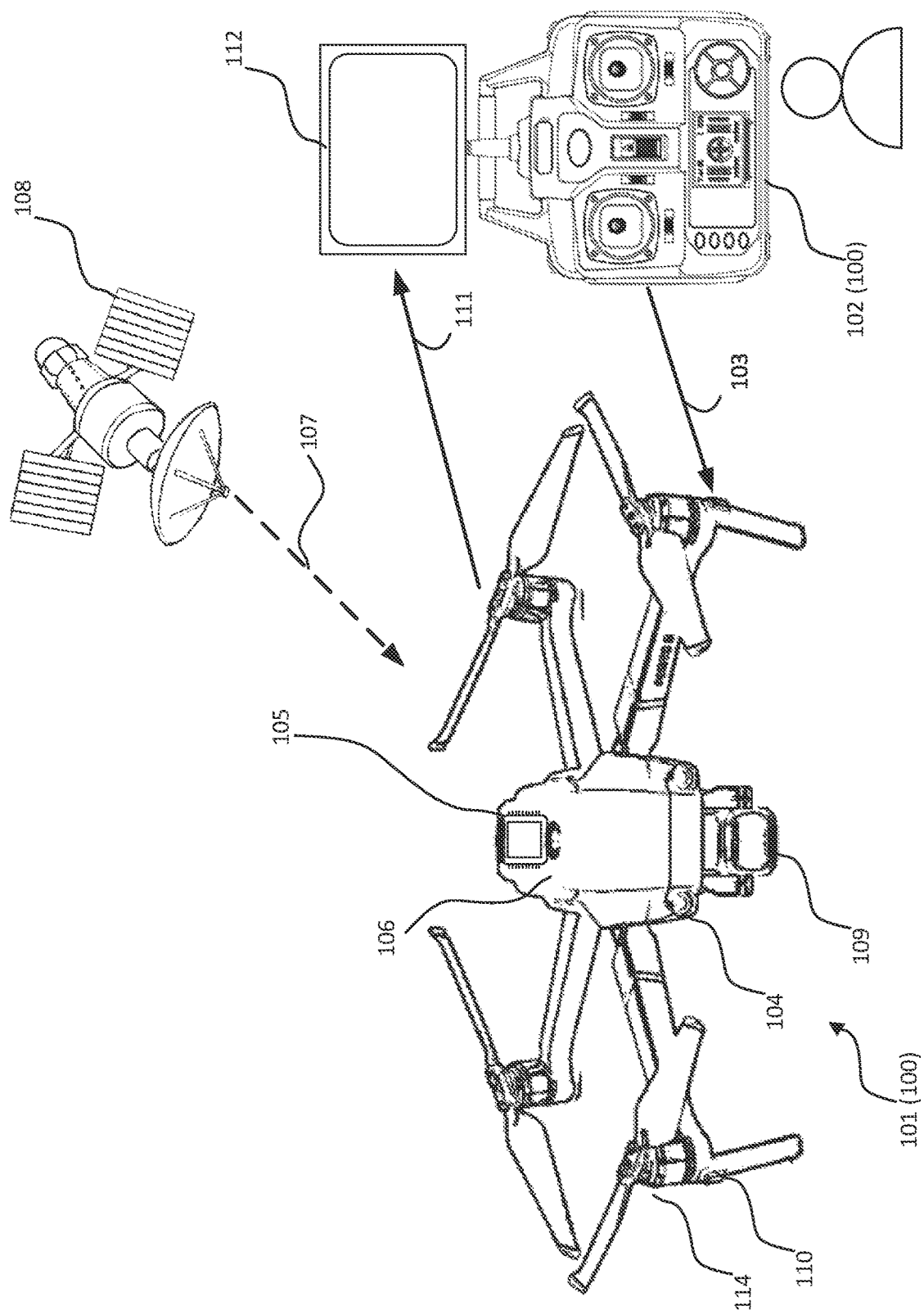
FIG. 1 is a schematic illustration of an unmanned aerial system (UAS).

Referring to FIG. 1, an unmanned aerial system (UAS) (100) can include an unmanned aerial vehicle (UAV) (101) and a controller (102). The controller (102) can use a data link (103) to communicate control commands from the controller (102) to the UAV (101). The controller (102) may include at least one communication circuit that is configured to provide communication, that constitutes the data link (103), via very high frequency (VHF), ultra-high frequency (UHF), or other wireless technology that is analog or digital radio conveying. The controller (102) via the data link (103) may control power levels of the engines (114) of the UAV (101) or control surfaces of the UAV (101). More abstract commands like pitch, yaw, and roll, similar to those of helicopters or aircraft, can also be used. An experienced pilot can operate some UAVs with those basic controls, not relying on any advanced onboard processing of control signals inside a UAV. UAVs have been available in many forms, including as helicopters and aircraft.

Advances in onboard electronic designs more recently allow the offload of certain tasks from the human operator to the UAV itself. Many UAVs, today, include sensor(s) (104) that indicate to an onboard controller (105) of the UAV (101) characteristics of the UAV (101) such as, for example, the attitude and the acceleration of the UAV (101). The onboard controller (105) can be a computer system with a scaled-down or non-existent user interface. The information obtained by the sensor(s) (104), in addition to the control inputs received from the data link (103) from the controller (102), may allow the UAV (101) to remain stable unless positive control input is obtained from the controller (102).

Even more recently, UAVs can include a receiver (106) configured to receive communication from one of the Global Navigation Satellite Systems (GNSS), such as the Global Positioning System (GPS) operated by the United States. FIG. 1 illustrates a single satellite (108) that provides a signal (107) as such communication, to represent a GNSS. However, the receiver (106) of the UAV (101) may receive communication from a GNSS that includes three or more, and typically four or more, line-of-sight satellites to triangulate the position of the UAV (101) in space. The receiver (106), which may be a GNSS receiver, may determine with fair accuracy the position of the UAV (101) in space and time. In some UAVs, a GNSS can be augmented by additional sensors (such as an ultrasonic or LIDAR sensor) of the UAV (101) on the vertical (Z−) axis to enable soft landings (not depicted). The UAV (101), according to some embodiments, may be configured to perform features such as "fly home" and "auto-land" based on GNSS capabilities, where the UAV (101) flies to a location that was defined as its home location. Such features may be performed by the UAV (101) based upon a simple command from the controller (102) (like: the push of a single button) or in case of a loss of the data link (103) from the controller (102) or other timeout of meaningful control input.

As another recent development, the UAV (101) may also include one or more cameras (109). In some cases, the UAV (101) may include a gimbal-mounted camera as one of the cameras (109) and can be used to record pictures and video of a quality sufficient for the UAV's users—today, often in High Definition TV resolution. In some cases, the UAV (101) may include other cameras (110), often covering some or all axes of movement, and the UAV (101) may be configured to perform onboard signal processing based on signals from the cameras (110) for collision avoidance with both fixed and moving objects.

In some cases, the UAV (101) may include a "main" camera as one of the cameras (109) and its camera signal can be communicated by a communication interface (e.g. communication circuit) of the UAV (101) via a data link (111) in real-time towards the human user, and displayed on a display device (112) included in, attached to, or separate from the controller (102). The data link (111) may be the same as or different from the data link (103). Accordingly, UAVs may be successfully flown out of line-of-sight of a human pilot, using a technique known as "First Person View" (FPV).

Figure 2:
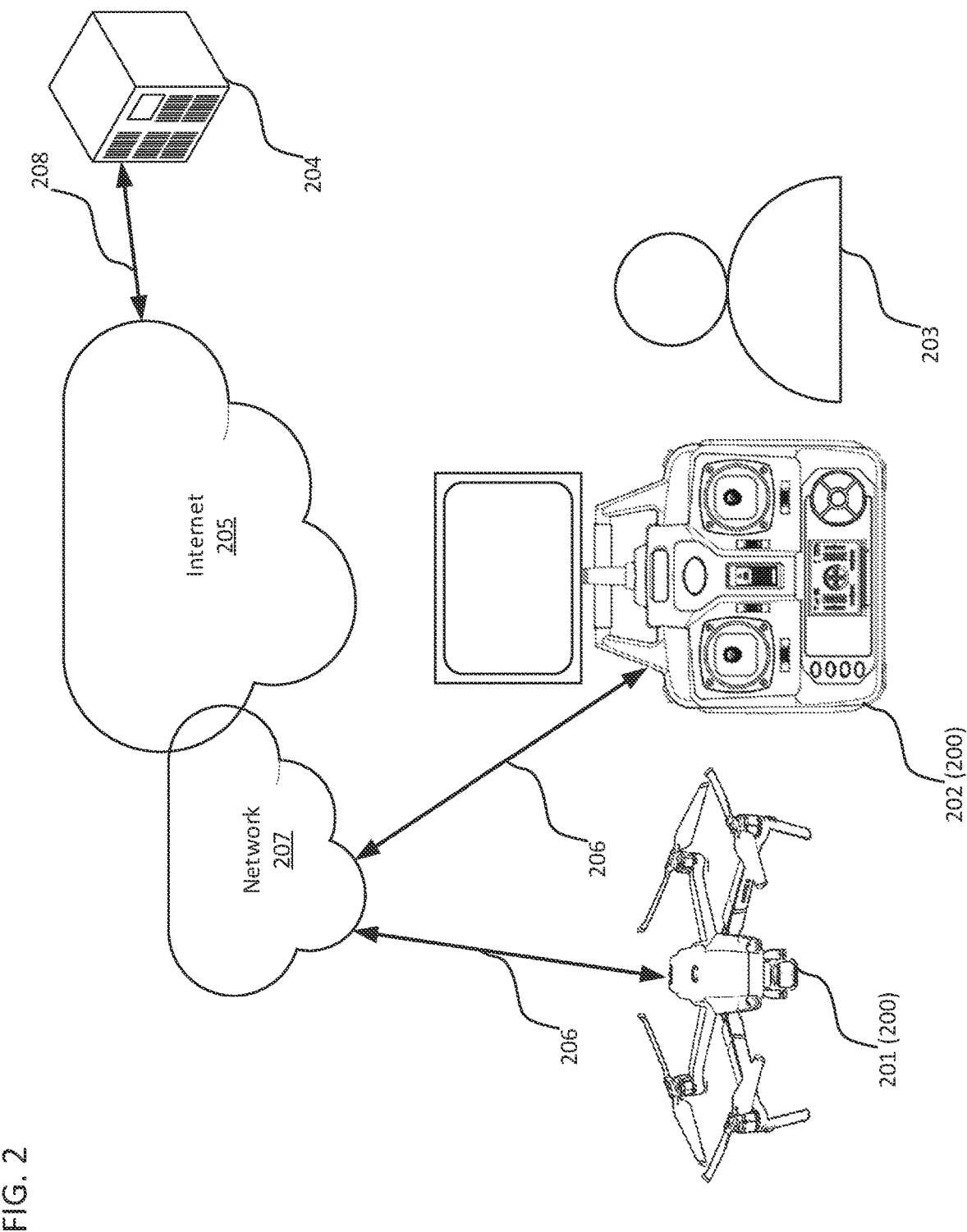
FIG. 2 is a schematic illustration of a UAS that includes UAS communication with at least one server.

Referring to FIG. 2, a UAS (200) may include a UAV (201) and a controller (202). The UAV (201) and the controller (202) may be the same or similar to the UAV (101) and the controller (102) illustrated in FIG. 1, respectively. According to an embodiment, the UAS (200), potentially operated by a human pilot (203), may be configured to inform one or more USSs (204) about the position of the UAV (201) in real-time. The reporting can be conducted using the Internet (205). For all but the most exotic use cases involving tethered UAVs, this may imply that one or both of the UAV (201) and the controller (202) of the UAS (200) may configured to have a connection (206) over a wireless network such as a network (207) (e.g. 5G Network) to the Internet (205), and the USS (204) also may have a connection (208) to the Internet (205). Such a scenario may be assumed herein, but embodiments of the present disclosure are not limited thereto. Networks other than the Internet (205) may also be used. For example, conceivably, a closed wireless network that is not the Internet could be used to communicate between the UAS (200) and the USS (204). Closed wireless networks may be used for certain military UAVs. When referring to the "Internet" henceforth, such networks are meant to be included.

Many physical wireless network technologies may be deployed in uses that enable connections (206) (e.g. wireless connections) and networks (207) (e.g. wireless networks) to connect systems such as the controller (202) or the UAV (201) of the UAS (200) to the Internet (205). For outdoor applications, mobile networks may be used such as, for example, $5^{th}$ Generation or "5G" networks. Henceforth, the use of such a 5G network may be assumed but embodiments of the present disclosure are not limited thereto. Other physical network technologies can equally be employed, including for example, 3G, 3.5G, 4G, LTE mobile networks, wireless LAN in infrastructure or ad hoc mode, zig-bee, and so on. In embodiments of the present disclosure, a mobile network carrying the Internet can offer bi-directional communication, such as, for example, between the UAS (200) and the USS (204). The Quality of Service in each direction may differ however. According to embodiments of the present disclosure, the UAV (201), the controller (202), and/or the USS (204) may include communication interfaces (including for example, a transmitter and/or a receiver) and at least one processor with memory that implements one or more of the physical wireless network technologies, so as to be configured to communicate via one or more of the network types of the present disclosure.

With reference to FIG. 2, the connections (206) between the Internet (205) through a network (207) (e.g. a 5G network) to the UAV (201) and/or the controller (202) can be bi-directional. When using Internet protocols such as Internet Protocol (IP), Transmission Control Protocol (TCP), User Datagram Protocol (UDP), Hypertext Transfer Protocol (HTTP), Quick UDP Internet Connections (QUIC), and similar, for the communication between the UAS (200) and the USS (204), then by the nature of such protocols, a bi-directional link may be required for those protocols to work.

Figure 3:
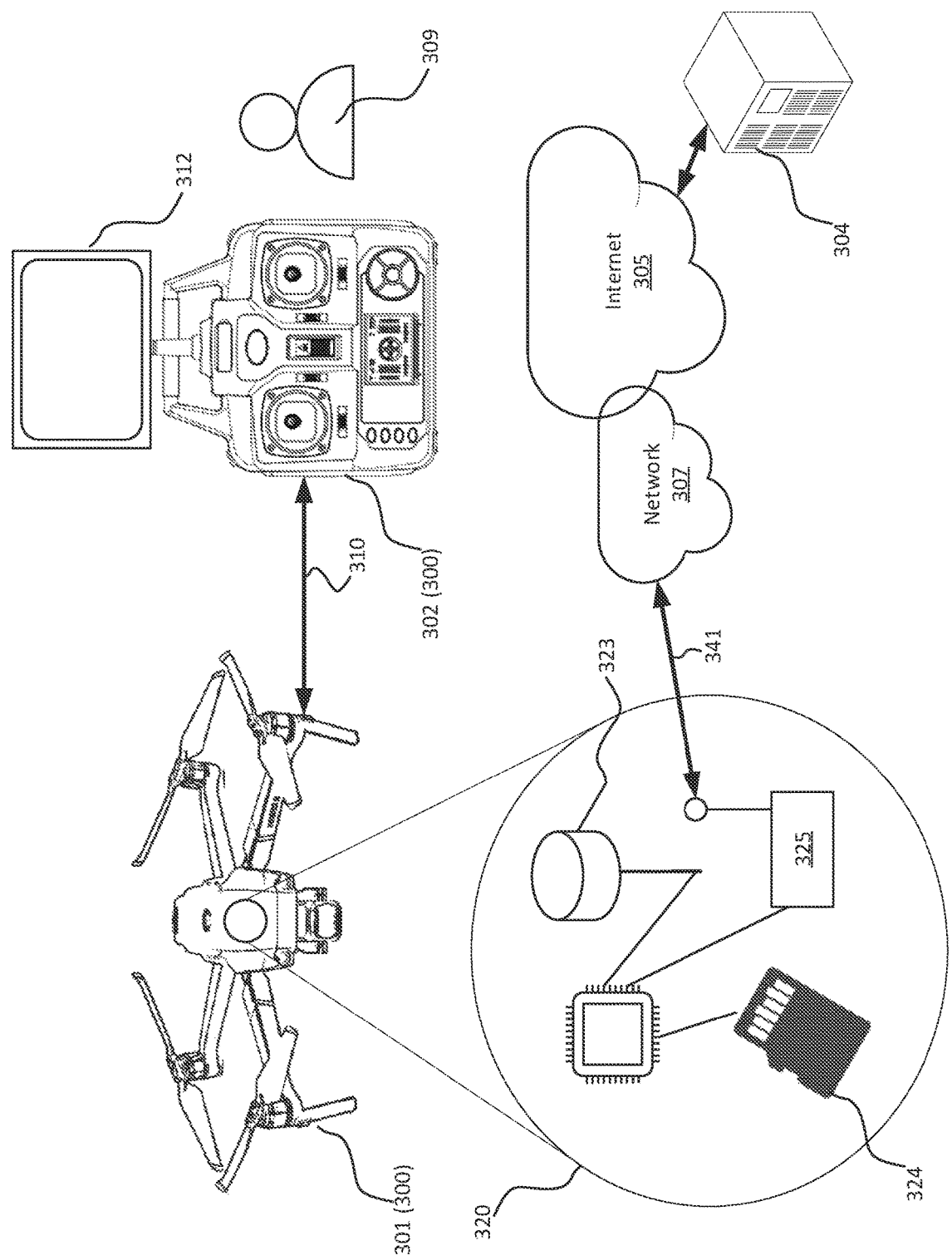
FIG. 3 is a schematic illustration of a system, including a UAS, in accordance with an embodiment.
Figure 4:
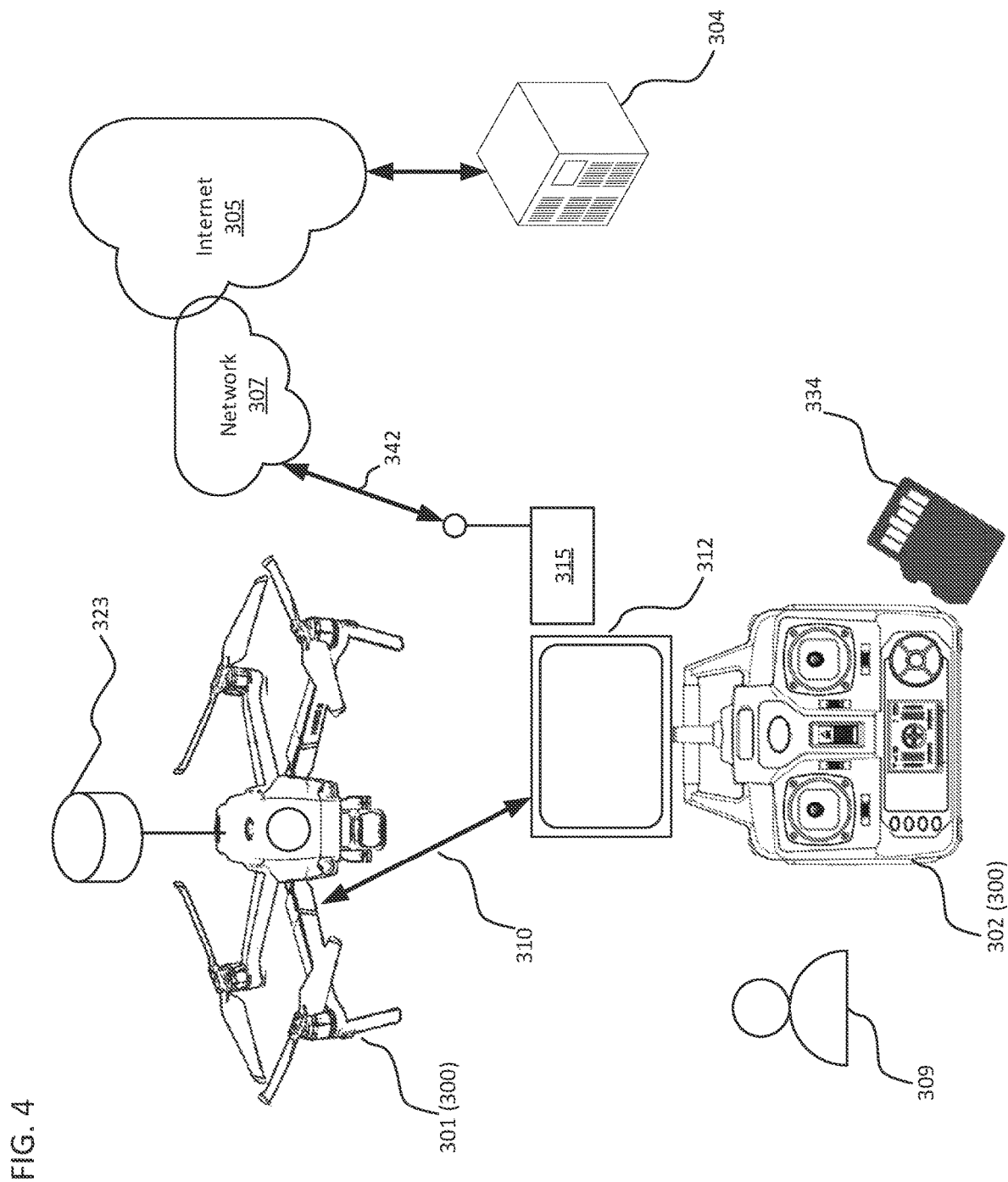
FIG. 4 is a schematic illustration of a system, including a UAS, in accordance with an embodiment.

Referring to FIGS. 3-4, in an embodiment of the present disclosure, a system may be provided. The system may include a UAV (301) and a controller (302), that together constitute a UAS (300). The UAV (301) and the controller (302) may include any number of the hardware (e.g. cameras and communication interfaces) and software components described with respect to the UAS (100) and the UAS (200) illustrated in FIGS. 1-2, and may be configured to perform the functions described with respect to the UAS (100) and the UAS (200). According to embodiments, with reference to FIG. 3, the UAV (301) may include a computer system (320) that includes at least one processor and memory storing computer code, wherein the computer code is configured to cause the UAV (301) to perform its functions when executed by the at least one processor of the UAV (301). The computer system (320) may be implemented by any number of the components of computer system (900) described later below with reference to FIG. 9, and may exclude most user interface components illustrated in FIG. 9. The computer system (320) may be an embedded system and may advantageously (for space and weight reasons) be part of, or integrated into, the onboard flight control circuitry of the UAV (301). The computer system (320) may have a mechanism to obtain its location in three-dimensional space. For example, the computer system (320) may include a GPS antenna (323) that, together with a GPS receiver, may be one example of such mechanisms. The computer system (320) may include other mechanisms such as, for example, a combination of GPS with (potentially more accurate) barometric altitude sensors, a triangulation mechanism to determine a lateral position from ground-based navigation tools (omnidirectional range navigation systems (VORs), cell phone towers, etc.), and so forth. The UAV (301) may also include memory storage (324) accessible by the user (309) of the UAV (301). For example, as illustrated in FIG. 3, the memory storage (324) may be a micro-SD card. However, the memory storage (324) could also be another changeable semiconductor storage, onboard NV-RAM in the UAV (301) that is accessible through a network plug from a computer or wireless LAN, and so forth.

The controller (302) may also include a computer system that includes at least one processor and memory storing computer code, wherein the computer code is configured to cause the controller (302) to perform its functions when executed by the at least one processor of the controller (302). The computer system of the controller (302) may be implemented by any number of the components of computer system (900) described later below with reference to FIG. 9. With reference to FIG. 4, the controller (302) may include a memory storage (334) accessible by the user (309) of the controller (302). The memory storage (334) may have a same or similar configuration as the memory storage (324). According to embodiments, one, none, or both of the memory storage (324) and the memory storage (334) may be included in the UAS (300).

The memory storage (324) and/or the memory storage (334) may have at least a sufficient size to store information pertaining to the airspace(s) the UAV may operate in. Such information may include digital representations of charts, Notice to Airmen (NOTAMs), Temporary Flight Restrictions (TFRs), and so forth. The digital information may be interpreted by the computer system (320) of the UAV (301) and/or the computer system of the controller (302), and may be compared (e.g. correlated) with the position of the UAV (301) in three dimensions (including lateral position and altitude). The computer system (320) of the UAV (301) and/or the computer system of the controller (302) may determine, as a result of the comparison (e.g. correlation) process, that the UAV (301) is "legal to fly" or "not legal to fly" in the airspace that the UAV (301) currently occupies. Alternatively or additionally, the computer system (320) of the UAV (301) and/or the computer system of the controller (302) may determine other results such as "legal to fly but approaching the legal airspace boundary", "legal to fly but will be illegal within 10 seconds if course is not altered", and so forth. The memory storage (324) and/or the memory storage (334) may be loaded with digital information pertaining to the airspace(s) the UAV (301) is anticipated to fly in.

The UAS (300) may obtain the digital information (or additional digital information that may update the digital information) pertaining to the airspace(s), during power-up, pre-flight, or flight, of the UAV (301), by one or more from among the wireless connection (341) and the wireless connection (342). For example, with reference to FIG. 3, the UAV (301) of the UAS (300) may be configured to have a wireless connection (341) over a wireless network such as a network (307) (e.g. a 5G Network) to the Internet (305), and one or more servers (304) (e.g. a USS) may have a connection to the Internet (305). Alternatively or additionally, with reference to FIG. 4, the controller (302) of the UAS may be configured to have a wireless connection (342) over a wireless network such as the network (307) (e.g. a 5G Network) to the Internet (305), and the one or more servers (304) may have a connection to the Internet (305). Accordingly, the UAV (301) and/or the controller (302) of the UAS (300) may be configured to communicate with the one or more servers (304) and/or similar servers operated by relevant authorities over airspace, or designated thereof, via the Internet (305). Via the wireless connection (341) and/or the wireless connection (342), the UAS (300) may query the one or more servers (304) (e.g. the USS), and receive the digital information (or additional digital information) pertaining to the airspace(s) from the one or more servers (304).

For example, according to embodiments, the UAV (301) and/or the controller (302) may query the USS (408) (and/or the similar servers) for one or more of the following, which the UAV (401) and/or the controller (302) may then obtain and store in the memory storage (324) and/or the memory storage (334):

(A) Charts: In a case that the UAV (301) or the controller (302) determines that onboard charts in the memory storage (324) and/or the memory storage (334) for a relevant area(s) are not current (e.g. aeronautical charts may carry an expiration date); the UAS (300) may query for and obtain charts pertaining to a particular area that is identified by the UAS (300). For example, the particular area may be a geographical location (e.g. a location of the UAS (401)) that is obtained by the UAS (300) from the GPS antenna (323), or other geo-reference data, including a reasonable radius around the UAV's (301) current location wherein the reasonable radius may be calculated by the UAV (301) or the controller (302) based on the endurance (e.g. maximum flight time) of the UAV (301), a maximum speed of the UAV (301), and a safety factor to accommodate for wind and other environmental factors.

(B) NOTAMs: The UAS (300) may query for and obtain NOTAMs pertaining to a particular area that is identified by the UAS (300), wherein the particular area may be the same or similar as the particular areas described above.

(C) TFRs: The UAS (300) may query for and obtain TFRs pertaining to a particular area that is identified by the UAS (300), wherein the particular area may be the same or similar as the particular area described above.

(D) Other Information: The UAS (300) may query for and obtain other information relevant for the flight of the UAV (e.g. pertaining to the particular area that is identified by the UAS (300)). For example, the other information may include weather data, including, for example, wind data. According to embodiments, the weather data may be used by the UAS (300) to determine the safety factor for calculating the reasonable radius around the UAV's (301) current location.

Information received using the aforementioned mechanisms can be integrated with the onboard information in the memory storage (324) and/or the memory storage (334) and used as described further below.

Details of protocols used for the communication between the UAS (300) (e.g. the UAV (301) or the controller (302)) and the one or more servers (304) (e.g. the USS) may depend on the services offered by the one or more servers (304). Historically, NOTAMs (e.g. TFRs), as an example, were available in files covering geographic areas of air traffic control centers (several US states in size). According to embodiments of the present disclosure, the UAS (300) (e.g. the UAV (301) or the controller (302)) may (a) request the file corresponding to the state the UAV (301) is operating in (e.g. as identified by the UAS (300) based on GPS location and an onboard chart), (b) download the pertinent textual NOTAM file (which can be a few ten or perhaps 100 Kbyte in size) using protocols such as FTP, or HTTP, (c) parse the file for relevant information, and (e) integrate the relevant information identified with onboard chart information in the memory storage (324) and/or the memory storage (334). Such a process may occur at least once before the flight, but also several times during the flight, for example in 1-minute or 5-minute intervals. Such process may be practical due to the comparatively small file size. Other access mechanisms of the present disclosure, described below, may be even more efficient.

More recently, airspace authorities including the FAA have implemented modern query interfaces that allow automated download of information pertinent to a specific location with a granularity much finer than a state. These interfaces can be based on RESTful operations. Representational State Transfer (REST), is a technique in which a client can query a server identified by a base Unified Resource Indicator (URI) through standard HTTP methods (including, for example, GET, POST, PUT, PATCH, or DELETE) in a defined format. One such defined standardized format is known as Java Object Notation (JSON).

With reference to FIG. 3, the computer system (320) of the UAV (301) may include a communication interface that includes, for example, one or more communicators such as a communicator (325), which may include, for example, a 5G antenna. The communicator (325) may be configured to send data to and receive data (e.g. the information pertaining to the airspace(s)) from the Internet (305) by using the network (307). The communicator (325), or another communicator of the communication interface of the UAV (301), may be configured to send data (e.g. sensor data, video data, the information pertaining to the airspace(s)) to and receive data (e.g. command data) from the controller (302) via a wireless connection (310). The controller (302) may also have a communication interface with a communicator that is configured to send data (e.g. commands) to and receive data (e.g. sensor data, video data, the information pertaining to the airspace(s)) from the UAV (301) via the wireless connection (310). With reference to FIG. 4, a communicator (315) of the controller (302), or another communicator of the communication interface of the controller (302), may be configured to send data to and receive data (e.g. the information pertaining to the airspace(s)) from the Internet (305) by using the network (307). Each communicator of the present disclosure may include, for example, a transmitter and a receiver.

According to embodiments, the UAS (300) may be configured to receive the digital information pertaining to the airspace(s). According to embodiments, the UAS (300) may be configured to communicate the digital information pertaining to the airspace(s) between the UAV (301) and the controller (302). According to embodiments, the UAV (301) and/or the controller (302) may be configured to make determinations (e.g. illegal flight) based on the digital information pertaining to the airspace(s). According to embodiments, the UAV (301) and/or the controller (302) may be configured to cause the UAV (301) and/or the controller (302) to warn the user (309) about the determinations, and/or cause the UAV (301) to perform actions (e.g. automatic return or land) based on the determinations. Examples of warning the user (309) of a determination is provided below.

Referring again to FIGS. 3-4, after having obtained updates to the chart information stored in the memory storage (324) and/or the memory storage (334) in accordance with any of the above described mechanisms or any other suitable mechanisms of embodiments of the present disclosure, the UAS (300) may communicate the result of the comparison (e.g. correlation) process, based on the updated chart information, to the user (309). While flying the UAV (301), the user (309) may not be particularly interested in the details that were obtained. Instead, the user (309) may be mostly interested in an indication of the event that the UAV's (301) flight is, or has become, illegal.

According to embodiments, with reference to FIG. 3, the UAS (300) may inform the user (309) by using the wireless connection (310) between the UAV (301) and the controller (302) to communicate a signal codifying the result of the comparison (e.g. correlation), and inform the user (309) through, for example, vibration of the controller (302), a visual signal such as a warning, or a message on the display (312) that may be a part of (or attached to) the controller (302). For example, the wireless connection (310) may be available. If, however, no such wireless connection is available for any reason, the UAV (301) may alternatively or additionally include onboard mechanisms that allow it to inform the user (309) of the result of the comparison (e.g. correlation) process. For example, the UAV (301) may include ground-visible warning lights. As another example, the UAV (301) may "bob" (rapid oscillating vertical motion).

Figure 6:
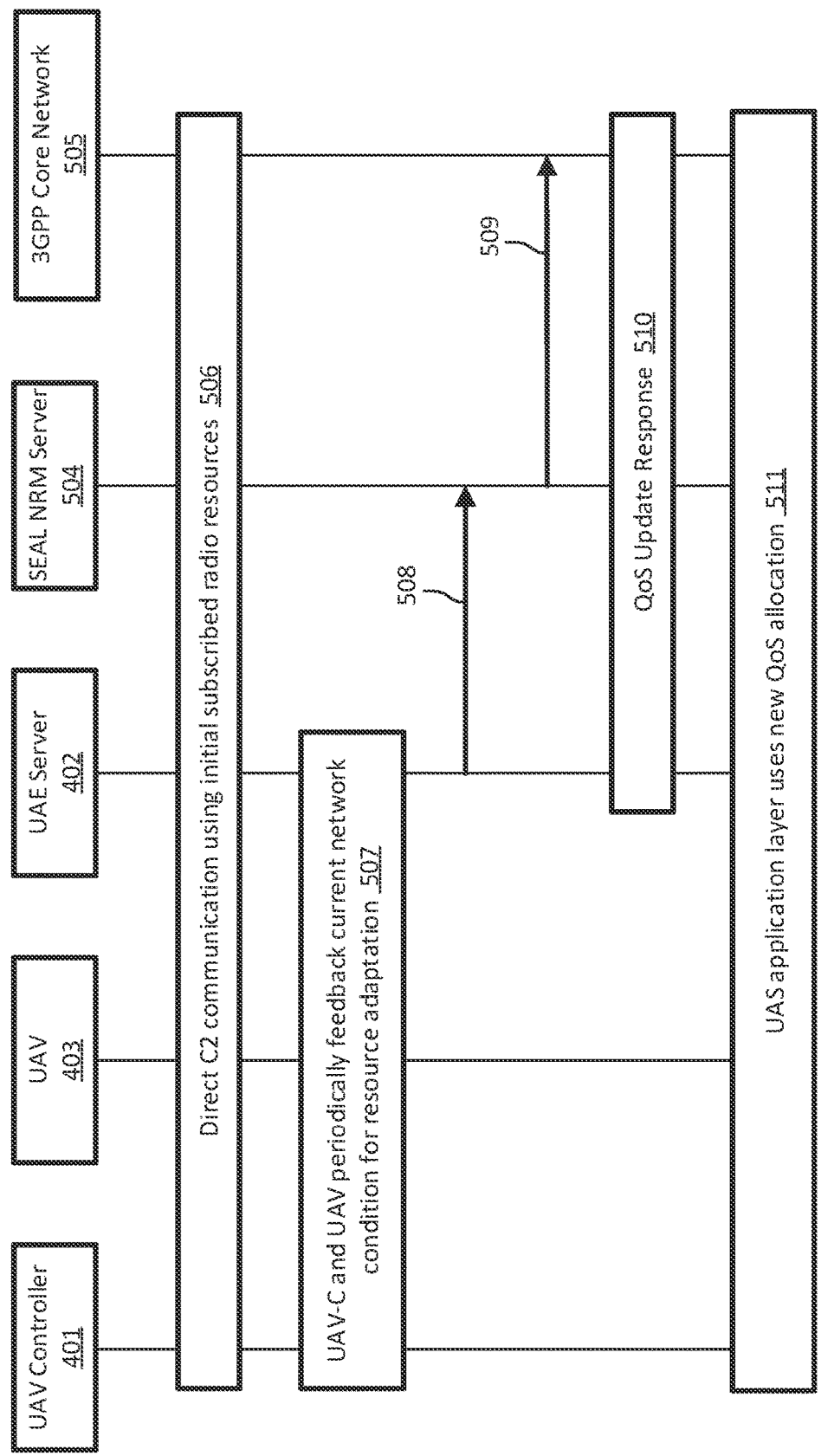
FIG. 6 is schematic illustration of a high-level workflow of group-based direct C2 QoS provisioning, in accordance with an embodiment.

Referring to FIG. 6, embodiments of the present disclosure may include an alternative or additional implementation which shifts some of the computational burden from the UAV (301) to the controller (302). For example, the controller (302), in this case, may have access to the memory storage (334) that includes (potentially updated) chart data, and may perform the aforementioned comparison (e.g. correlation) based on position information (obtained by the GPS antenna (323)) sent by the UAV (301) over the wireless connection (310). The chart data may be updated using any suitable mechanisms including the ones described above, through the communicator (315) (e.g. a 5G interface), the network (307) (e.g. a 5G network), and the Internet (305), to the one or more servers (304) (e.g. the USS). The result of the comparison (e.g. legal or not legal to fly) may become available locally at the controller (302), and may be communicated by the controller (302) to the user (309) by, for example, a visual signal (e.g. via a light), a message on the display (312), a vibration alert, or other suitable mechanisms. As the controller (302) controls the UAV (301), the result may also be made visible by the UAV (301) itself, for example by a light attached to the UAV (301) or by the UAV "bobbing". Indicating the result of the determination by the UAV (301) may be beneficial because the user (309) may be concentrated on the UAV (301) itself rather than the user interface of the controller (302).

In the 3rd Generation Partnership Project (3GPP) 5G wireless architecture, there may be a SEAL (service enabler architecture layer for verticals) which provides procedures, information flows, and APIs to support vertical applications over a 3GPP system. To ensure efficient use and deployment of vertical applications over 3GPP systems, SEAL services may include, but is not limited to, group management, configuration management, location management, identity management, key management, and network resource management.

Figure 8:
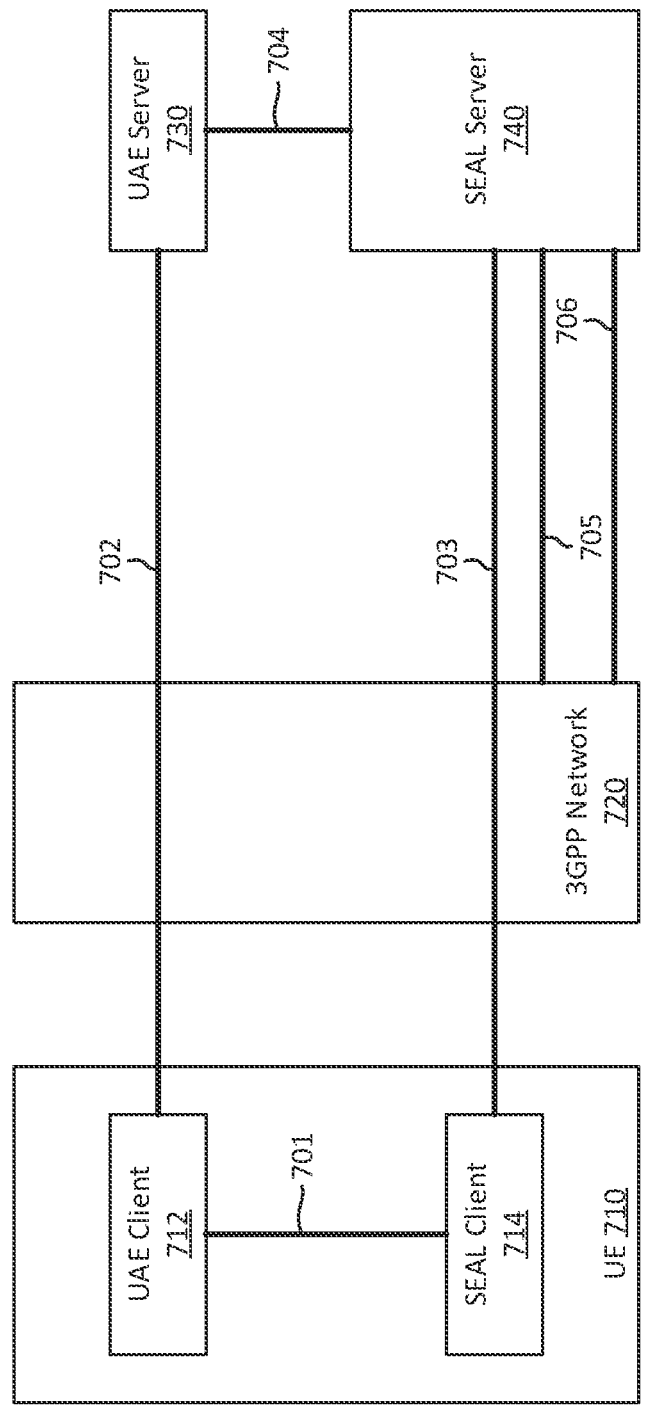
FIG. 8 is a schematic illustration of an example SEAL general architecture for a UAS.

With reference to FIG. 8, an example SEAL general architecture for a UAS is described below.

The SEAL general architecture may include, for example, user equipment (UE) (710) (e.g. a UAS), a 3GPP network (720), a UAV Application Enablement (UAE) server (730), and a SEAL server(s) (740). The UE(s) (710) may include, for example, a UAE client(s) (712) and a SEAL client(s) (714).

The UAE client (712) may provide the UAE-client side functionalities, and may support interactions with SEAL client(s) (714) over a reference point (701). The UAE server (730) may provide the UAE-server side functionalities, and may support interactions with the SEAL server(s) (740) over a reference point (704).

The SEAL client(s) (714) may provide the client side functionalities corresponding to the specific SEAL service, and the SEAL client(s) (714) may support interactions with the UAE client(s) (712), and may also support interactions with the corresponding SEAL client (714) between two UEs (710). The SEAL server(s) (740) may provide the server side functionalities corresponding to the specific SEAL service, may support the interactions with the UAE server(s) (730), and may also support interactions with the corresponding SEAL server (740) in distributed SEAL deployments.

Interactions related to vertical application layer support functions between the UAE client (712) and a vertical application layer (VAL) server may be provided over a reference point (702). The VAL server may be a part of, or provided with, the UAE server (730). The interactions between a SEAL client (714) and the corresponding SEAL server (740) may be provided over a reference point (703). The reference point (703) may be a specific SEAL service (such as network resource management) reference point, which may be specified in the specific SEAL service functional model.

A network resource management (NRM) server may be provided that communicates with a 3GPP Policy and Charging Rules Function (PCRF) over a reference point (705). The NRM server may communicate with a 3GPP 5G Policy Control Function (PCF) via a reference point (706) to control unicast resources from the underlying 3GPP network (720). The NRM server may be a part of, or provided with, the SEAL server (740), and the PCRF and the PCF may be included in the 3GPP network (720).

According to embodiments, a 3GPP 5G wireless architecture may include a SEAL group manager (GM) server that is configured to enable group management operations for an upper application layer. Also, the 3GPP 5G wireless architecture may include a SEAL network resource manager (NRM) server that is configured to enable support for unicast and multicast network resource management for the upper application layer.

There are currently three C2 (command and control) communication modes that are supported in the current 5G wireless technology: Direct C2, Network-Assisted C2 and UAS Traffic Management (UTM)-Navigated C2 communication.

Direct C2 is a mode in which a direct C2 link between a UAV controller and a UAV is established such that the UAV controller and the UAV may communicate with each other and are both registered to the 5G network using a configured and scheduled radio resource that is provided by the 5G network for direct C2 communication. That is, for example, direct C2 may be a mode in which the UAV controller and the UAV communicate through the 3GPP network (e.g. 5G network), instead of using Bluetooth, WIFI, or any other unlicensed radio resource. According to embodiments, both the UAV controller and the UAV may have a designed 3GPP subscription and may also have a 3GGP UE ID.

Network-Assisted C2 communication is a mode in which a UAV controller and a UAV register and establish respective unicast C2 communication links to a 5G network and communicate with each other via the 5G network.

UTM-Navigated C2 communication is a mode in which a UAV has been provided a pre-scheduled flight plan, and a UTM (e.g. a USS server) maintains a C2 communication link with the UAV in order to regularly monitor the flight status of the UAV, verify the flight status with up-to-date dynamic restrictions, provide route updates, and navigate the UAV whenever necessary.

As mentioned above, both UAV originated QoS (uplink from the UAS to the network) or UAS terminated QoS (downlink from the network to UAS) may be maintained for UAS application layer operations. The QoS may include, but is not limited to, network bandwidth, latency, jitter, data loss rate, etc. Currently, the three supported C2 communication modes may require different network resources support from the UAS application layer.

Embodiments of the present disclosure may solve the above problem and other problems.

According to embodiments, with respect to direct C2 communication, a service enabler architecture layer (SEAL) group manager server may be provided to ensure a match between a pair of a UAV and a UAV controller, such as one based on certain UAS ID configurations. Network QoS provisioning can be triggered by a SEAL network resource manager (NRM) server based on group ID. In some cases, subgroups (or others types of distinctive groups) may be created for a UAV and a UAV controller respectively to achieve separate QoS control for each up- and downlink. Embodiments of the present disclosure may provide network resources support by providing direct C2 QoS provisioning using a group-based approach.

Figure 5:
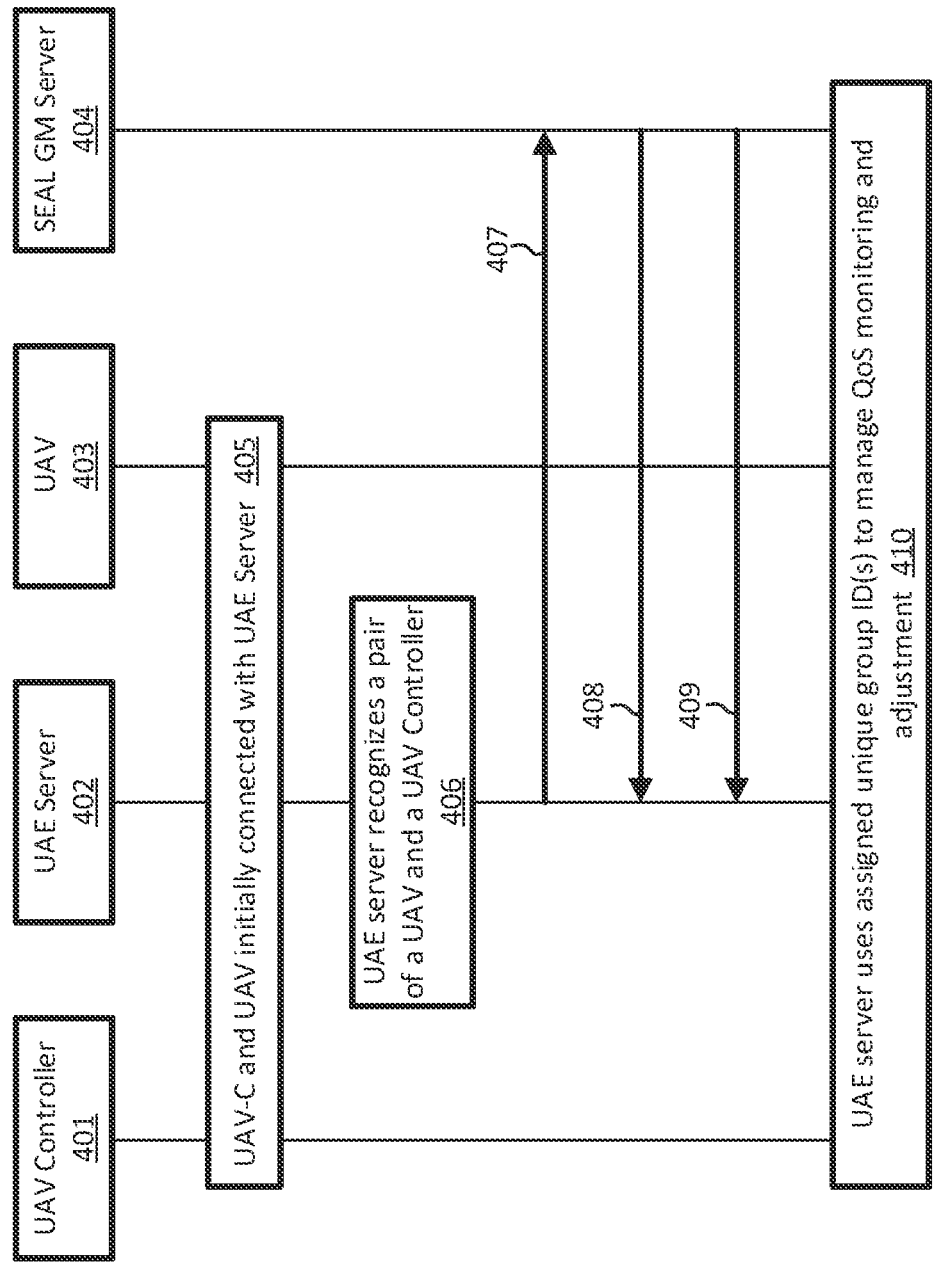
FIG. 5 is schematic illustration of a high-level procedure for UAV group creation using a SEAL group manager server, in accordance with an embodiment.

With reference to FIG. 5, a method of group creation for one pair of a UAV and a UAV controller is illustrated. As shown in FIG. 5, a UAV controller (401), a UAV Application Enablement (UAE) server (402), a UAV (403), and a SEAL GM server (404) may be provided. According to embodiments, such components may be implemented in the system illustrated in FIGS. 3-4. For example, the UAV controller (401) may correspond to the controller (302), the UAV (403) may correspond to the UAV (301), and the UAE server (402) and the SEAL GM server (404) may be implemented by one or more servers (304) and a same or different at least one processor thereof. Such components may communicate with each other using the various connections illustrated in FIGS. 3-4.

According to embodiments, systems (e.g. the system illustrated in FIGS. 3-4) may be configured to provide direct C2 communication, Network-Assisted C2 communication, and/or UTM-Navigated C2 communication, and may be configured to perform a method of group creation as discussed below.

With reference to FIG. 5, both the UAV controller (401) and UAV (403) may initially connect to the UAE server (402) with a common UAS ID (step 405).

The UAE server (402) may recognize a unique pair of the UAV controller (401) and the UAV (403) after the connection (step 406). For example, the UAE server (402) may recognize that the UAV controller (401) and the UAV (403) are a pair based on receiving a same UAS ID from both the UAV controller (401) and the UAV (403).

After recognizing the pair, the UAE server (402) may send a group creation request for the pair to the SEAL GM server (404) using a link between the UAE server (402) and the SEAL GM server (404) (e.g. a GM-S reference link) (step 407).

Based on receiving the group creation request, the SEAL GM server (404) may create one group ID for the pair of the UAV (403) and the UAV controller (401) (step 408).

In some cases, subgroups (or other types of distinct groups) may also be created for the UAV (403) and the UAV controller (401), respectively (step 409).

The UAE server (402) may use the returned group ID(s) for QoS management (e.g. initial QoS allocation, QoS monitoring, and QoS adjustment) (step 410). In cases where subgroups (or other types of distinct groups) are created for the UAV (403) and the UAV controller (401), the UAE server (402) may use a respective group ID (e.g. a subgroup ID) to manage QoS for the UAV (403) and the UAV controller (401) separately.

Once group ID(s) have been assigned by the SEAL GM server (404), the UAE server (402) may use the ID(s) for QoS provisioning for the direct C2 communication.

For example, with reference to FIG. 6, a high-level workflow of group based direct C2 QoS provisioning is illustrated. As shown in FIG. 6, a SEAL NRM server (504) and a 3GPP core network (505) may be additionally provided. The SEAL NRM server (504) may be implemented by the one or more servers (304) illustrated in FIGS. 3-4. For example, the SEAL NRM server (504) may be implemented by the same or different server(s) as the UAE server (402) and/or the SEAL GM server (404), and/or a same or different at least one processor thereof. The 3GPP core network (505) may correspond to the network (307) illustrated in FIGS. 3-4.

As shown in FIG. 6, the UAV controller (401) and/or the UAV (403) may use initially allocated network QoS setup for direct C2 communications (step 506). For example, the UAV controller (401) and/or the UAV (403) may use radio resources that were initially allocated by the UAE server (402).

The UAE server (402) may periodically monitor expected QoS for the UAV (403) and the UAV controller (401) using group ID, and/or subgroup IDs(s) corresponding to the UAV (403) and the UAV controller (401) (step 507). For example, the UAV (403) and the UAV controller (401) may periodically feedback current (3GPP) network conditions for resource adaptation to the UAE server (402). Current network conditions may include, for example, bandwidth, delay, jitter, etc.

In cases where the UAE server (402) determines that the direct C2 communication does not satisfy at least one pre-defined QoS requirement, the UAE server (402) may choose to send a QoS adaptation request to the SEAL NRM server (504) using an NRM-S reference point to trigger QoS adaptation (step 508). The QoS adaptation request may be sent per group or sub-group depending on how the UAE server (402) handles group creation. According to embodiments, the QoS adaptation request may include information that identifies the UAE server (402), a group ID and/or subgroup IDs that correspond to the UAV (403) and the UAV controller (401), and a resource adaptation requirement (e.g. bandwidth, resource, etc.) for the UAV (403) and/or the UAV controller (401).

Based on upon the QoS adaptation request, the SEAL NRM server (504) may perform network resource adaptation (step 509). For example, the network resource adaptation may include sending a request for updated QoS requirements to the 3GPP core network (505). As an example, the network resource adaptation may be performed via reference point 705 and reference point 706, that are indicated in FIG. 8.

The SEAL NRM server (504) may notify the UAE server (402) of a QoS update in a response (step 510). According to embodiments, the response may include result information that indicates a success or failure of the QoS adaptation. The response can also include an updated value for one or more of the parameters included in the network resource adaptation request (e.g. negotiation of resource offering).

A UAS application layer may then use the updated QoS allocation with respect to C2 communication (step 511). According to embodiments, the UAS application layer may include functional application entities of the UAV controller (401), the UAV (403), and the one or more servers (304) that are configured to utilize SEAL services such as location management, group management, configuration management, identity management, key management, and network resource management. According to embodiments, the UAV controller (401) and the UAV (403) may each include a UAS application specific client as a part of the UAS application layer, and the one or more servers (304) may include a UAS application specific server that has a link to the UAE server (402). The UAS application specific server, the UAE server (402), and the SEAL GM server (404) may be implemented by a same or different one or more of the servers (304), and a same or different at least one processor thereof.

Systems of the present disclosure may comprise at least one processor and memory storing computer code. The computer code, when executed by the at least one processor, may be configured to cause the at least one processor to perform the functions of the embodiments of the present disclosure. For example, the UAVs and the UAV controllers of the present disclosure may each comprise a respective at least one processor and memory storing computer code configured to cause the UAVs and the UAV controllers to perform their respective functions. Furthermore, the servers (e.g. UAE server (402), SEAL GM server (404), SEAL NRM server (504)) of the present disclosure may be implemented by a same or different at least one processor and/or same or different memory storing computer code.

Figure 7:
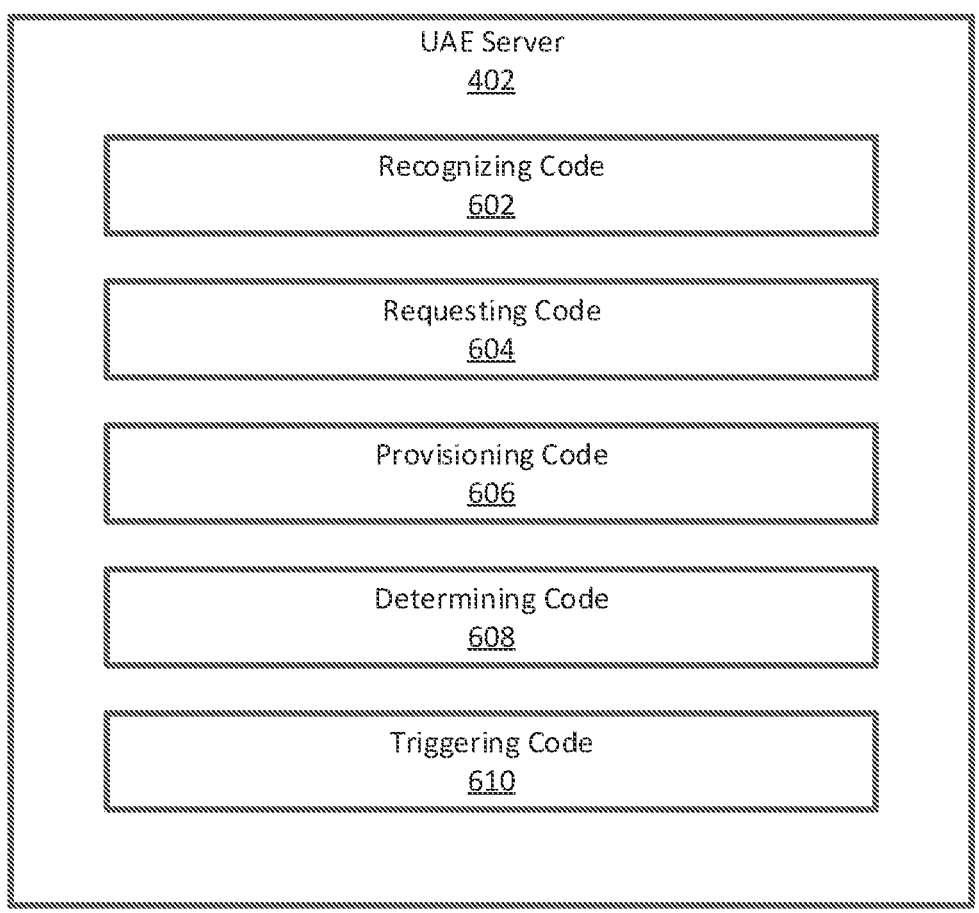
FIG. 7 is a schematic illustration of computer code of a UAE server in accordance with an embodiment.

An example of computer code, computer code that implements the UAE server (402) is described below with reference to FIG. 7. The computer code may include, for example, recognizing code (602), requesting code (604), provisioning code (606), determining code (608), and triggering code (610).

The recognizing code (602) may be configured to cause the UAE server (402) to recognize a UAV and a controller of the UAV as a pair, based on the UAV and the controller being communicatively connected to the UAE server (402). For example, the recognizing code (602) may be configured to cause the UAE server (402) to recognize the UAV and the controller of the UAV as the pair, based on the UAE server (402) obtaining a first identifier of the UAV and a second identifier of the controller that are the same.

The requesting code (604) may be configured to cause the UAE server (402) to request the SEAL GM server (404) to provide a group identifier of the pair, or a respective group identifier for each of the pair.

The provisioning code (606) may be configured to cause the UAE server (402) to provision QoS for communication of the pair, using the group identifier of the pair or the respective group identifier for each of the pair.

The determining code (608) may be configured to cause the UAE server (402) to determine whether a condition of the communication does not satisfy a pre-defined QoS requirement.

The triggering code (610) may be configured to cause the UAE server (402) to trigger, based on determining that the condition of the communication does not satisfy the pre-defined QoS requirement, the SEAL NRM server (504) to perform adaptation of the QoS for the pair. For example, the triggering code (610) may be configured to cause the UAE server (402) to send a request to the SEAL NRM server (504) to perform the adaptation of the QoS.

While example code that is performed by the UAE server (402) is described above, it should be understood by a person of ordinary skill in the art that each of the UAVs, UAVs, the UAV controllers, and the servers of the present disclosure may include and/or be implemented by computer code that is configured to cause the UAVs, UAV controllers, and the servers to perform their respective functions, including the functions described in the present disclosure.

Figure 9:
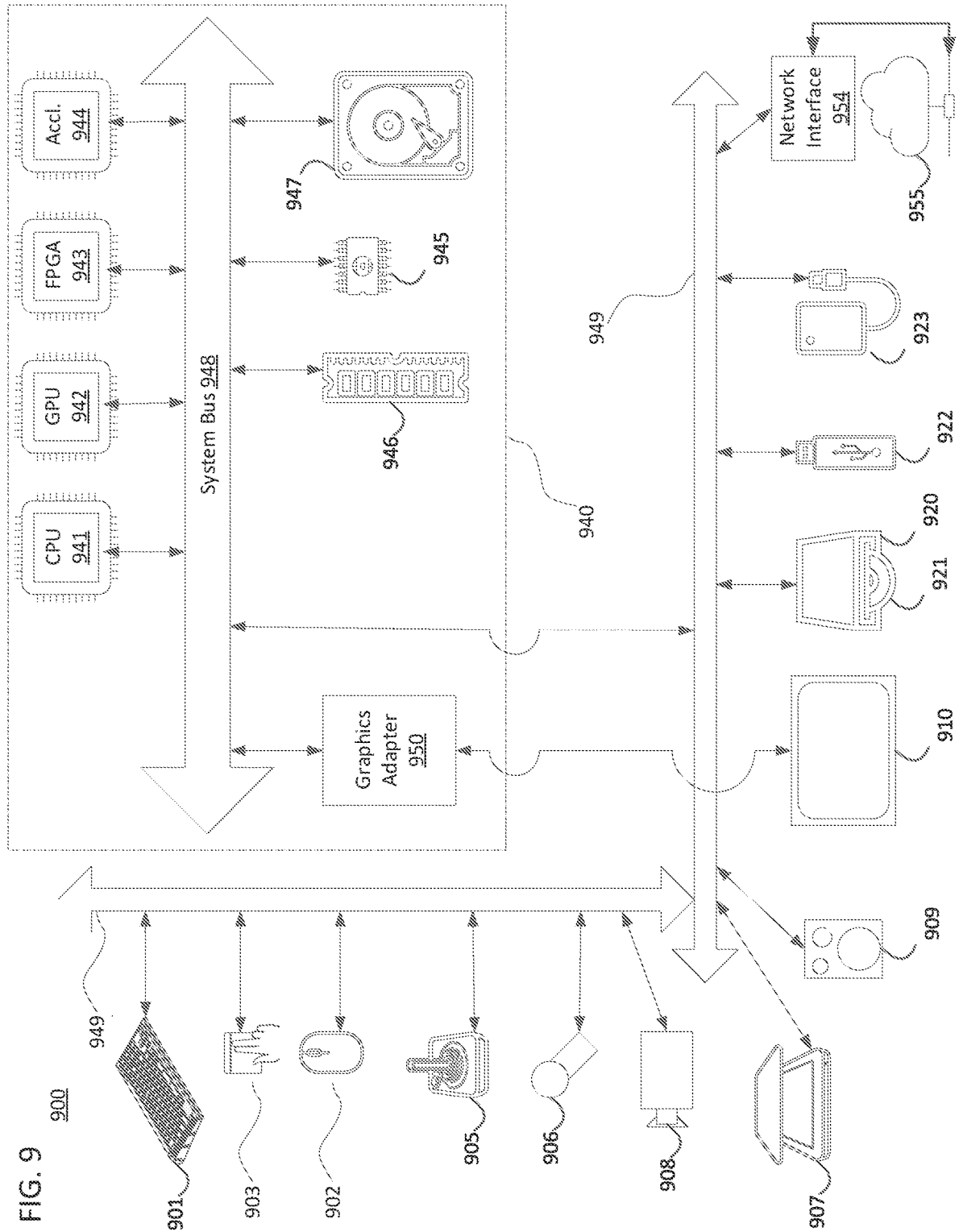
FIG. 9 is a schematic illustration of a computer system in accordance with an embodiment.

With reference to FIG. 9, a computer system (900) suitable for implementing certain embodiments of the disclosed subject matter is illustrated.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch-screen (910), joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices. For example, such devices may be audio output devices (such as: speakers (909), headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, SSDs, and the like, may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter (950) may be included in the core (940).

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the mass storage (947) that is internal. Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (900) having architecture, and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor that implements at least one server, the method comprising:

obtaining a group identifier of a pair of an unmanned aerial vehicle (UAV) and a controller of the UAV, or a respective group identifier for each of the pair;

managing Quality of Service (QoS) for communication of the pair, using the group identifier of the pair or the respective group identifier for each of the pair.

2. The method of claim 1, wherein
the communication of the pair is direct command and control (C2) communication between the UAV and the controller.

3. The method of claim 1, further comprising:
recognizing the UAV and the controller of the UAV as the pair, based on the UAV and the controller being communicatively connected to the at least one server.

4. The method of claim 3, wherein the recognizing the pair comprises:
obtaining a first identifier of the UAV and a second identifier of the controller; and
recognizing the UAV and the controller as the pair based on the first identifier and the second identifier being the same.

5. The method of claim 1, wherein
the obtaining comprises obtaining the group identifier of the pair, based on requesting creation of one or more groups for the pair, and
the managing comprises provisioning the QoS for the communication of the pair, using the group identifier of the pair.

6. The method of claim 1, wherein
the obtaining comprises obtaining the respective group identifier for each of the pair, based on requesting creation of one or more groups for the pair, and
the managing comprises provisioning the QoS for the communication of the pair, using the respective group identifier for each of the pair.

7. The method of claim 1, wherein
the at least one server includes a UAV Application Enablement (UAE) server.

8. The method of claim 1, wherein the managing comprises triggering, based on determining that a condition of the communication does not satisfy a pre-defined QoS requirement, performance of adaptation of the QoS for the pair.

9. The method of claim 8, wherein
the condition of the communication includes at least one from among bandwidth, latency, jitter, and data loss rate.

10. The method of claim 8, further comprising:
obtaining an indication that the QoS was successfully adapted.

11. A system comprising:
at least one processor;
memory storing computer code, the computer code comprising:
managing code configured to cause at least one server, implemented by the at least one processor, to manage Quality of Service (QoS) for communication of a pair of an unmanned aerial vehicle (UAV) and a controller of the UAV, using a group identifier of the pair or a respective group identifier for each of the pair.

12. The system of claim 11, wherein
the communication of the pair is direct command and control (C2) communication between the UAV and the controller.

13. The system of claim 11, wherein the computer code further comprises:
recognizing code configured to cause the at least one server to recognize the UAV and the controller of the UAV as the pair, based on the UAV and the controller being communicatively connected to the at least one server.

14. The system of claim 13, wherein
the recognizing code is configured to cause the at least one server to recognize the UAV and the controller of the UAV as the pair, based on the at least one server obtaining a first identifier of the UAV and a second identifier of the controller that are the same.

15. The system of claim 11, wherein
the computer code further comprises requesting code configured to cause the at least one server to request the group identifier of the pair, and
the managing code is configured to cause the at least one server to provision the QoS for the communication of the pair, using the group identifier of the pair.

16. The system of claim 11, wherein
the computer code further comprises requesting code configured to cause the at least one server to request the respective group identifier for each of the pair, and
the managing code is configured to cause the at least one server to provision the QoS for the communication of the pair, using the respective group identifier for each of the pair.

17. The system of claim 11, wherein
the at least one server comprises a UAV Application Enablement (UAE) server.

18. The system of claim 11, wherein the managing code is configured to cause the at least one server to trigger, based on determining that a condition of the communication does not satisfy a pre-defined QoS requirement, performance of adaptation of the QoS for the pair.

19. The system of claim 18, wherein
the condition of the communication includes at least one from among bandwidth, latency, jitter, and data loss rate.

20. A non-transitory computer-readable medium storing computer code that is configured to, when executed by at least one processor that implements at least one server, cause the at least one processor to:
manage Quality of Service (QoS) for communication of each of a pair of an unmanned aerial vehicle (UAV) and a controller of the UAV, using a group identifier of the pair or a respective group identifier for each of the pair.

* * * * *